(12) United States Patent
Lee et al.

(10) Patent No.: US 12,176,576 B2
(45) Date of Patent: Dec. 24, 2024

(54) SOLID ELECTROLYTE MEMBRANE AND SOLID-STATE BATTERY COMPRISING SAME

(71) Applicant: LG ENERGY SOLUTION, LTD., Seoul (KR)

(72) Inventors: Jung-Pil Lee, Daejeon (KR); Sung-Joong Kang, Daejeon (KR); Eun-Bee Kim, Daejeon (KR); Ji-Hoon Ryu, Daejeon (KR); Suk-Woo Lee, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 524 days.

(21) Appl. No.: 17/606,545

(22) PCT Filed: Apr. 28, 2020

(86) PCT No.: PCT/KR2020/005628
§ 371 (c)(1),
(2) Date: Oct. 26, 2021

(87) PCT Pub. No.: WO2020/226334
PCT Pub. Date: Nov. 12, 2020

(65) Prior Publication Data
US 2022/0216570 A1    Jul. 7, 2022

(30) Foreign Application Priority Data

May 3, 2019    (KR) .................. 10-2019-0052531
Nov. 15, 2019  (KR) .................. 10-2019-0147026

(51) Int. Cl.
*H01M 50/451*    (2021.01)
*H01M 10/0562*   (2010.01)
*H01M 10/0565*   (2010.01)

(52) U.S. Cl.
CPC ..... *H01M 50/451* (2021.01); *H01M 10/0562* (2013.01); *H01M 10/0565* (2013.01)

(58) Field of Classification Search
CPC ............. H01M 50/431; H01M 50/443; H01M 50/451; H01M 50/457; H01M 50/463; H01M 50/489–491
See application file for complete search history.

(56) References Cited

U.S. PATENT DOCUMENTS 6,645,675 B1 * 11/2003 Munshi ............... H01M 4/0404
                                                    429/234
7,070,632 B1 *  7/2006 Visco .................. H01M 4/5815
                                                    429/231.95

(Continued)

FOREIGN PATENT DOCUMENTS

CN    1363124 A    8/2002
CN   108370060 A   8/2018

(Continued)

OTHER PUBLICATIONS

Extended European Search Report for European Application No. 20801453.0, dated May 30, 2022.

(Continued)

*Primary Examiner* — Kevin M Bernatz
(74) *Attorney, Agent, or Firm* — Birch, Stewart, Kolasch & Birch, LLP

(57) ABSTRACT

Provided is a solid electrolyte membrane for a solid-state battery, including at least two solid electrolyte layers and at least one volume-swelling layer, wherein the volume-swelling layer is disposed between the solid electrolyte layers. The solid electrolyte membrane includes (a) an ion conductive solid electrolyte material, and the volume-swelling layer includes (b) inorganic particles, wherein the inorganic particles form an alloy with lithium and include a metal, metal oxide or both. Thus, it is possible to provide a solid (Continued)

electrolyte membrane for a solid-state battery fundamentally prevented from a short-circuit by inhibiting growth of lithium dendrite.

11 Claims, 4 Drawing Sheets

(56) References Cited

U.S. PATENT DOCUMENTS

| | | | |
|---|---|---|---|
| 11,973,219 B2* | 4/2024 | Chae | H01M 4/131 |
| 2003/0124429 A1 | 7/2003 | Okada et al. | |
| 2006/0008700 A1* | 1/2006 | Yong | H01M 50/417 |
| | | | 429/251 |
| 2010/0112454 A1 | 5/2010 | Visco et al. | |
| 2011/0229761 A1* | 9/2011 | Cui | H01M 4/387 |
| | | | 427/78 |
| 2011/0287318 A1* | 11/2011 | Loveness | H01M 4/366 |
| | | | 977/890 |
| 2017/0170515 A1 | 6/2017 | Yushin et al. | |
| 2017/0222244 A1 | 8/2017 | Kim et al. | |
| 2017/0279163 A1 | 9/2017 | Jang et al. | |
| 2017/0338522 A1 | 11/2017 | Hu et al. | |
| 2018/0123181 A1 | 5/2018 | Son et al. | |
| 2018/0166743 A1* | 6/2018 | Lee | H01M 10/052 |
| 2018/0198114 A1* | 7/2018 | Bonhomme | H01M 4/134 |
| 2018/0358597 A1* | 12/2018 | Liao | H01M 50/44 |
| 2019/0334147 A1* | 10/2019 | Hamamoto | H01M 50/403 |
| 2020/0161710 A1* | 5/2020 | Watanabe | H01M 4/382 |
| 2020/0303707 A1 | 9/2020 | Zhou et al. | |
| 2021/0320332 A1* | 10/2021 | Lee | H01M 50/417 |
| 2021/0408579 A1 | 12/2021 | Lee et al. | |
| 2022/0131231 A1* | 4/2022 | Du | H01M 50/454 |
| 2022/0200097 A1* | 6/2022 | Lee | H01M 10/0562 |
| 2023/0187781 A1* | 6/2023 | Cheng | H01M 50/497 |
| | | | 429/251 |
| 2023/0327288 A1* | 10/2023 | Wang | H01M 50/449 |
| | | | 429/129 |
| 2023/0335862 A1* | 10/2023 | Yin | H01M 50/446 |
| 2023/0387549 A1* | 11/2023 | Ishiguro | H01M 50/409 |
| 2024/0014439 A1* | 1/2024 | Patel | H01M 10/0562 |
| 2024/0047822 A1* | 2/2024 | Evans | H01M 50/497 |
| 2024/0274977 A1* | 8/2024 | Liu | H01M 50/443 |

FOREIGN PATENT DOCUMENTS

| | | | | |
|---|---|---|---|---|
| EP | 3 712 983 A1 | 9/2020 | | |
| EP | 3 902 050 A1 | 10/2021 | | |
| JP | 2004-342358 A | 12/2004 | | |
| JP | 3724960 B2 | 12/2005 | | |
| JP | 2009-211910 A | 9/2009 | | |
| JP | 2011-3500 A | 1/2011 | | |
| JP | 2011-76909 A | 4/2011 | | |
| JP | 2013-54949 A | 3/2013 | | |
| JP | 2017-54761 A | 3/2017 | | |
| JP | 2017-224536 A | 12/2017 | | |
| JP | 2019-212431 A | 12/2019 | | |
| JP | 2020-87524 A | 6/2020 | | |
| KR | 10-2016-0037782 A | 4/2016 | | |
| KR | 10-2017-0092327 A | 8/2017 | | |
| KR | 10-2018-0015843 A | 2/2018 | | |
| KR | 10-2018-0031949 A | 3/2018 | | |
| KR | 10-2018-0046693 A | 5/2018 | | |
| WO | WO-2016069749 A1 * | 5/2016 | | H01M 10/052 |
| WO | WO-2018183771 A1 * | 10/2018 | | H01M 10/052 |
| WO | WO-2019074925 A1 * | 4/2019 | | H01M 10/0525 |

OTHER PUBLICATIONS

Indian Office Action for Indian Application No. 202117051250, dated Jan. 25, 2023, with English translation.
International Search Report (PCT/ISA/210) issued in PCT/KR2020/005628 mailed on Aug. 24, 2020.

* cited by examiner

SOLID ELECTROLYTE MEMBRANE AND SOLID-STATE BATTERY COMPRISING SAME

TECHNICAL FIELD

The present disclosure relates to an electrolyte membrane for a solid-state battery and a solid-state battery including the same.

The present application claims priority to Korean Patent Application No. 10-2019-0052531 filed on May 3, 2019 and Korean Patent Application No. 10-2019-0147026 filed on Nov. 15, 2019 in the Republic of Korea, the disclosures of which are incorporated herein by reference.

BACKGROUND ART

A lithium ion battery using a liquid electrolyte has a structure in which a negative electrode and positive electrode are defined by a separator, and thus may cause a short-circuit when the separator is damaged by deformation or external impact, resulting in a risk, such as overheating or explosion. Therefore, it can be said that development of a solid electrolyte capable of ensuring safety is a very important problem in the field of lithium ion secondary batteries.

A lithium secondary battery using a solid electrolyte is advantageous in that it has enhanced safety, prevents leakage of an electrolyte to improve the reliability of a battery, and facilitates manufacture of a thin battery.

However, such a battery using a solid electrolyte is problematic in that lithium dendrite formed from the negative electrode during the operation of the battery is grown and is in contact with the positive electrode, resulting in a short-circuit.

DISCLOSURE

Technical Problem

The present disclosure is designed to solve the problems of the related art. Particularly, the present disclosure is directed to providing a solid electrolyte membrane for a solid-state battery which fundamentally inhibits growth of lithium dendrite so that a short-circuit may not be generated, and thus has improved safety. The present disclosure is also directed to providing a solid-state battery including the solid electrolyte membrane. These and other objects and advantages of the present disclosure may be understood from the following detailed description and will become more fully apparent from the exemplary embodiments of the present disclosure. Also, it will be easily understood that the objects and advantages of the present disclosure may be realized by the means shown in the appended claims and combinations thereof.

Technical Solution

In one aspect of the present disclosure, there is provided a solid electrolyte membrane for a solid-state battery according to any one of the following embodiments.

According to the first embodiment, there is provided a solid electrolyte membrane for a solid-state battery, including: (a) an ion conductive solid electrolyte material; and (b) inorganic particles capable of lithium ion or lithium intercalation, wherein the inorganic particles react physically, chemically or electrochemically with lithium ions or lithium so that they may be lithiated, include a metal, metal oxide or both, undergo volumetric swelling by the lithiation, and are disposed in such a manner that they may not be in direct contact with an electrode.

According to the second embodiment of the present disclosure, there is provided the solid electrolyte membrane as defined in the first embodiment, which includes at least two solid electrolyte layers and at least one volume-swelling layer, and the volume-swelling layer is disposed between the solid electrolyte layers and includes the inorganic particles (b) capable of lithium ion or lithium intercalation.

According to the third embodiment of the present disclosure, there is provided the solid electrolyte membrane as defined in the first or the second embodiment, wherein the inorganic particles (b) have a volumetric swelling ratio of 10-1000% after the lithiation as compared to the volume before the lithiation.

According to the fourth embodiment of the present disclosure, there is provided the solid electrolyte membrane as defined in any one of the first to the third embodiments, wherein the inorganic particles include Si, Sn, SiO, SnO, $MnO_2$, $Fe_2O_3$, or two or more of them.

According to the fifth embodiment of the present disclosure, there is provided the solid electrolyte membrane as defined in any one of the first to the fourth embodiments, wherein the inorganic particles (b) are present in an amount of 1-30 wt % based on 100 wt % of the solid electrolyte membrane.

According to the sixth embodiment of the present disclosure, there is provided the solid electrolyte membrane as defined in any one of the first to the fifth embodiments, wherein the volume-swelling layer has a thickness of 10 nm to 50 μm.

According to the seventh embodiment of the present disclosure, there is provided the solid electrolyte membrane as defined in any one of the first to the sixth embodiments, wherein the ion conductive solid electrolyte material (a) has an ion conductivity of $10^{-5}$ S/cm or more, and includes a polymeric solid electrolyte, oxide-based solid electrolyte, sulfide-based solid electrolyte, or two or more of them.

According to the eighth embodiment of the present disclosure, there is provided the solid electrolyte membrane as defined in the second embodiment, wherein the volume-swelling layer includes the inorganic particles (b) in an amount of 30-100 wt % based on 100 wt % of the volume-swelling layer.

According to the ninth embodiment of the present disclosure, there is provided the solid electrolyte membrane as defined in any one of the first to the eighth embodiments, wherein the inorganic particles are patterned with a plurality of pattern units, and the pattern units are distributed regularly or randomly.

According to the tenth embodiment of the present disclosure, there is provided the solid electrolyte membrane as defined in the ninth embodiment, wherein the solid electrolyte membrane includes at least two solid electrolyte layers and at least one volume-swelling layer and the volume-swelling layer is disposed between the solid electrolyte layers, the volume-swelling layer includes inorganic particles (b) capable of lithium ion or lithium intercalation, the volume-swelling layer includes the inorganic particles (b) and a copolymer to which the inorganic particles are chemically bound, and has a micropattern derived from the self-assembly of the copolymer, the copolymer includes a functional group capable of forming chemical binding with the inorganic particles, and the inorganic particles are bound to the copolymer by means of the functional group.

In another aspect of the present disclosure, there is provided a solid-state battery according to any one of the following embodiments.

According to the eleventh embodiment of the present disclosure, there is provided a solid-state battery including a positive electrode, a negative electrode and a solid electrolyte membrane interposed between the positive electrode and the negative electrode, wherein the solid electrolyte membrane is the same as defined in any one of the first to the tenth embodiments.

According to the twelfth embodiment of the present disclosure, there is provided the solid-state battery as defined in the eleventh embodiment, wherein the solid electrolyte membrane includes a first solid electrolyte layer, a second solid electrolyte layer and a volume-swelling layer, the volume-swelling layer is disposed between the solid electrolyte layers, the volume-swelling layer includes inorganic particles (b) capable of lithium ion or lithium intercalation, the first solid electrolyte layer faces the negative electrode, and the first solid electrolyte layer has a thickness larger than the thickness of the second solid electrolyte layer.

Advantageous Effects

The solid electrolyte membrane according to the present disclosure includes inorganic particles lithiated through the reaction with lithium, and thus fundamentally inhibits growth of lithium dendrite so that a short-circuit may not be generated. Thus, it is possible to provide a solid electrolyte membrane for a solid-state battery having improved safety, and a solid-state battery including the same.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing. Meanwhile, shapes, sizes, scales or proportions of some constitutional elements in the drawings may be exaggerated for the purpose of clearer description.

BEST MODE

Figure 1:
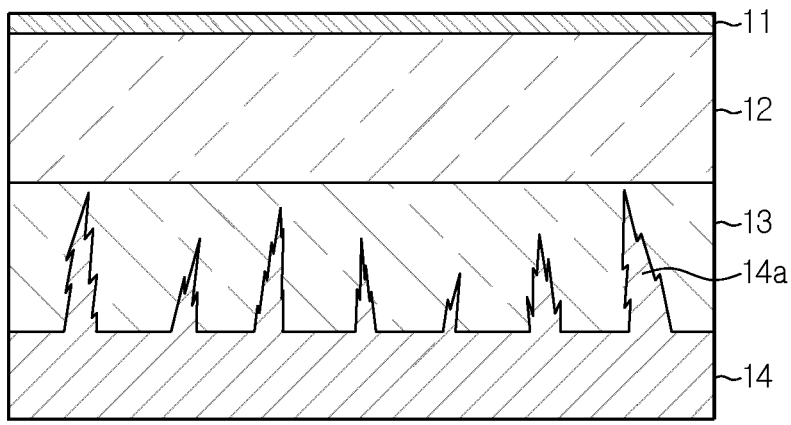
FIG. 1 is a schematic view illustrating the problem of a short-circuit caused by growth of lithium dendrite from the negative electrode in a conventional solid-state battery.

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the scope of the disclosure.

Throughout the specification, the expression 'a part [ includes] an element' does not preclude the presence of any additional elements but means that the part may further include the other elements.

As used herein, the terms 'approximately', 'substantially', or the like, are used as meaning contiguous from or to the stated numerical value, when an acceptable preparation and material error unique to the stated meaning is suggested, and are used for the purpose of preventing an unconscientious invader from unduly using the stated disclosure including an accurate or absolute numerical value provided to help understanding of the present disclosure.

As used herein, the expression 'A and/or B' means 'A, B or both of them'.

Specific terms used in the following description are for illustrative purposes and are not limiting. Such terms as 'right', 'left', 'top surface' and 'bottom surface' show the directions in the drawings to which they are referred. Such terms as 'inwardly' and 'outwardly' show the direction toward the geometrical center of the corresponding apparatus, system and members thereof and the direction away from the same, respectively. 'Front', 'rear', 'top' and 'bottom' and related words and expressions show the positions and points in the drawings to which they are referred and should not be limiting. Such terms include the above-listed words, derivatives thereof and words having similar meanings.

The present disclosure relates to a solid electrolyte membrane for a solid-state battery and a solid-state battery including the same. The solid electrolyte membrane for a solid-state battery according to the present disclosure includes inorganic particles forming an alloy with lithium in a volume-swelling layer, and thus fundamentally prevents a short-circuit. Thus, it is possible to provide a solid-state battery having improved safety.

FIG. 1 is a schematic view illustrating the problem of a short-circuit caused by growth of lithium dendrite from the negative electrode in a conventional solid-state battery. Herein, the battery may include lithium metal as a negative electrode active material. When lithium metal is used as a negative electrode active material, there is a problem of lithium dendrite growth from the negative electrode surface. In addition, when the grown lithium dendrite is in contact with a positive electrode, a short-circuit occurs. FIG. 1 is a schematic view illustrating such a conventional solid-state battery. In a solid-state battery, a solid electrolyte membrane functions as an electrical insulator between the positive electrode and the negative electrode. However, when a polymeric material is used as a solid electrolyte, the solid electrolyte member may be damaged due to growth of lithium dendrite. FIG. 1 shows a conventional solid-state battery using a solid electrolyte and schematically illustrates a mechanism of short-circuit generation caused by growth of lithium dendrite 14a. The solid-state battery as shown in FIG. 1 includes a positive electrode active material layer 12 formed on the surface of a current collector 11, and the positive electrode active material layer is laminated with a negative electrode layer 14 by means of a solid electrolyte layer 13. In the solid-state battery, lithium dendrite 14a may be grown at the negative electrode in the vertical direction, as the battery is used, and the solid electrolyte layer 13 may be damaged by the lithium dendrite so that the negative electrode may be in contact with the positive electrode, resulting in a short-circuit. Under these circumstances, there is a need for development of an electrolyte membrane for a solid-state battery which can inhibit growth of lithium dendrite. Referring to FIG. 1, in general, the conventional solid electrolyte membrane is formed into a layered structure by integrating particle-shaped ion conductive inorganic materials, and have a plurality of pores derived from interstitial volumes in the particles. Thus, lithium dendrite may be grown in the spaces provided by the pores and lithium dendrite grown through the pores may be in contact with the positive electrode, resulting in a short-circuit.

On the contrary, since the solid electrolyte membrane for a solid-state battery according to an embodiment of the present disclosure includes inorganic particles (b), it is possible to fundamentally inhibit a short-circuit caused by lithium dendrite growth during the operation of a battery.

Figure 2:
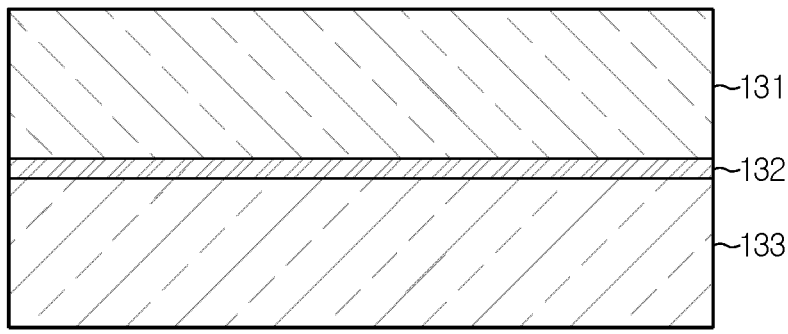
FIG. 2 is a schematic view illustrating the solid electrolyte membrane according to an embodiment of the present disclosure.

FIG. 2 is a schematic view illustrating the solid electrolyte membrane according to an embodiment of the present disclosure. The solid electrolyte membrane 130 is formed by stacking a first solid electrolyte layer 133, volume-swelling layer 132 and a second solid electrolyte layer 131, successively. Hereinafter, the present disclosure will be explained in detail with reference to FIG. 2.

In one aspect of the present disclosure, there is provided a solid electrolyte membrane for a solid-state battery, including: (a) an ion conductive solid electrolyte material; and (b) inorganic particles capable of lithium ion or lithium intercalation, wherein the inorganic particles react physically, chemically or electrochemically with lithium ions or lithium so that they may be lithiated, include a metal, metal oxide or both, undergo volumetric swelling by the lithiation, and are disposed in such a manner that they may not be in direct contact with an electrode.

(1) Solid Electrolyte Membrane

The solid electrolyte membrane according to the present disclosure includes a volume-swelling layer. For example, the solid electrolyte membrane may be applied to a solid-state battery using no liquid electrolyte, as an ion conductive electrolyte. According to an embodiment of the present disclosure, the solid electrolyte membrane may include at least two solid electrolyte layers, and a volume-swelling layer may be interposed between one solid electrolyte layer and another solid electrolyte layer. According to the present disclosure, each solid electrolyte layer includes an ion conductive solid electrolyte material (a), and the volume-swelling layer includes inorganic particles (b) capable of lithium ion or lithium intercalation.

According to the present disclosure, the solid electrolyte membrane includes a volume-swelling layer, allows electrical insulation between a positive electrode and a negative electrode, and provides an ion channel between the positive electrode and the negative electrode. In addition, the solid electrolyte membrane may show an ion conductivity of $1\times10^{-7}$ S/cm or more, preferably $1\times10^{-5}$ S/cm or more, at 25-150° C.

According to an embodiment of the present disclosure, the solid electrolyte membrane may have a thickness of 5-500 μm. Within the above-defined range, the solid electrolyte membrane may have a thickness of 10 μm or more, 20 μm or more, 30 μm or more, 50 μm or more, 100 μm or more, 200 μm or more, or 300 μm or more, in terms of physical strength and shape stability. Meanwhile, the solid electrolyte membrane may have a thickness of 400 μm or less, 300 μm or less, 200 μm or less, 100 μm or less, 70 μm or less, or 50 μm or less, in terms of ion conductivity. For example, the solid electrolyte membrane may have a thickness of 30-100 μm, or 30-50 μm.

The ion conductive solid electrolyte material may include at least one of a polymeric solid electrolyte and inorganic solid electrolyte.

According to an embodiment of the present disclosure, the polymeric solid electrolyte includes a polymer resin and lithium salt, and may be a solid polymeric electrolyte provided as a mixture of a solvated lithium salt with a polymer resin, or a polymer gel electrolyte prepared by impregnating a polymer resin with an organic electrolyte containing an organic solvent and a lithium salt.

For example, the solid polymeric electrolyte may include, as a polymer resin, any one selected from the group consisting of a polyether polymer, polycarbonate polymer, acrylate polymer, polysiloxane polymer, phosphazene polymer, polyethylene derivatives, alkylene oxide derivatives, phosphate polymer, polyalginate lysine, polyester sulfide, polyvinyl alcohol, polyvinylidene fluoride and a polymer containing an ionically dissociable group, or a mixture of two or more of them. However, the scope of the present disclosure is not limited thereto.

According to an embodiment of the present disclosure, the solid polymeric electrolyte may include, as a polymer resin, any one selected from the group consisting of a branched copolymer including polyethylene oxide (PEO) backbone copolymerized with a comonomer including an amorphous polymer, such as PMMA, polycarbonate, polydiloxane (pdms) and/or phosphazene, comb-like polymer and a crosslinked polymer resin, or a mixture of two or more of them.

According to an embodiment of the present disclosure, the polymer gel electrolyte includes a lithium salt-containing organic electrolyte and a polymer resin, wherein the organic electrolyte is used in an amount of 60-400 parts by weight based on the weight of the polymer resin. There is no particular limitation in the polymer used for the gel electrolyte, and particular examples of the polymer include any one selected from the group consisting of polyvinyl chloride (PVC) polymers, poly(methyl methacrylate) (PMMA) polymers, polyacrylonitrile (PAN), polyvinylidene fluoride (PVdF) and poly(vinylidene fluoride-co-hexafluoropropylene) (PVdF-HFP), or a mixture of two or more of them. However, the scope of the present disclosure is not limited thereto.

According to an embodiment of the present disclosure, in the electrolyte, the lithium salt is an ionizable lithium salt and may be represented by $Li^+X^-$. The anion ($X^-$) of lithium salt is not particularly limited and particular examples thereof include $F^-$, $Cl^-$, $Br^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$, $(CF_3CF_2SO_2)_2N^-$, or the like.

Meanwhile, according to an embodiment of the present disclosure, the polymeric electrolyte material may further include an additional polymer gel electrolyte. The polymer gel electrolyte has high ion conductivity ($10^{-4}$ S/cm or more) and has binding property so that it may provide not only a function as an electrolyte but also a function as an electrode binder resin imparting binding force in electrode active material particles and between an electrode layer and a current collector.

According to an embodiment of the present disclosure, when a polymeric material is used as an electrolyte material of a solid electrolyte layer, the solid electrolyte membrane may include a crosslinking agent and/or initiator in preparing the solid electrolyte layer. The crosslinking agent and/or initiator is not particularly limited, as long as it can initiate crosslinking or polymerization depending on heat, light and/or temperature conditions to induce crosslinking and/or polymerization of the polymeric material. According to an embodiment of the present disclosure, the crosslinking agent and/or initiator that may be used includes an organic peroxide, organometallic reagent, such as alkylated silver, and an azo compound, but is not limited thereto.

Meanwhile, according to the present disclosure, the inorganic solid electrolyte may include a sulfide-based solid electrolyte, an oxide-based solid electrolyte, or both.

According to an embodiment of the present disclosure, the sulfide-based solid electrolyte is an electrolyte ingredient containing a sulfur atom and is not particularly limited. The sulfide-based solid electrolyte may include at least one of a crystalline solid electrolyte, non-crystalline solid electrolyte (vitreous solid electrolyte) and a glass ceramic solid electrolyte. Particular examples of the sulfide-based solid electrolyte may include, but are not limited to: LPS-type sulfides containing sulfur and phosphorus, $Li_{4-x}Ge_{1-x}P_xS_4$ (wherein x is 0.1-2, particularly x is ¾, ⅔), $Li_{10\pm 1}MP_2X_{12}$ (wherein M=Ge, Si, Sn, Al, X=S, Se), $Li_{3.833}Sn_{0.833}As_{0.166}S_4$, $Li_4SnS_4$, $Li_{3.25}Ge_{0.25}P_{0.75}S_4$, $Li_2S$—$P_2S_5$, $B_2S_3$—$Li_2S$, $xLi_2S$—$(100-x)P_2S_5$ (wherein x is 70-80), $Li_2S$—$SiS_2$—$Li_3N$, $Li_2S$—$P_2S_5$—$LiI$, $Li_2S$—$SiS_2$—$LiI$, $Li_2S$—$B_2S_3$—$LiI$, or the like.

According to an embodiment of the present disclosure, the oxide-based solid electrolyte may be selected suitably from LLT-based electrolytes with a perovskite structure, such as $Li_{3x}La_{2/3-x}TiO_3$, LISICON-based electrolytes, such as $Li_{14}Zn(GeO_4)_4$, LATP-based electrolytes, such as $Li_{1.3}Al_{0.3}Ti_{1.7}(PO_4)_3$, LAGP-based electrolytes, such as ($Li_{1+x}Ge_{2-x}Al_x(PO_4)_3$), phosphate-based electrolytes, such as LiPON, or the like.

(2) Volume-Swelling Layer

The solid electrolyte membrane according to the present disclosure includes a volume-swelling layer, and the volume-swelling layer includes: (a) an ion conductive solid electrolyte material; and (b) inorganic particles capable of lithium ion or lithium intercalation.

The solid electrolyte membrane for a solid-state battery includes inorganic particles disposed in a position where they are not in direct contact with the negative electrode. The inorganic particles are in direct contact with lithium dendrite formed at the negative electrode during the operation of a battery so that they may be electrically connected with the negative electrode. In addition, the inorganic particles show a negative electrode potential. Therefore, the inorganic particles can function as a negative electrode active material. Then, lithium ion supplied from the positive electrode during the operation of the battery or lithium grown from lithium dendrite reacts physically or chemically with the inorganic particles so that the inorganic particles may be lithiated.

Herein, lithium may be lithium atom itself. Such lithium has electrical conductivity when it is in contact with the inorganic particles due to lithium dendrite and can show a negative electrode potential. Thus, the inorganic particles may be lithiated when they are in contact with lithium.

Figure 7:
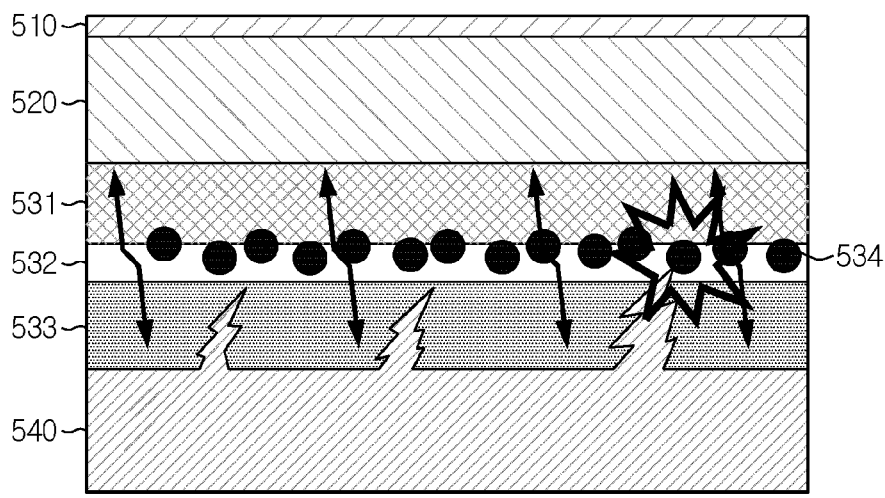
FIG. 7 and FIG. 8 are schematic views illustrating the solid-state battery including the volume-swelling layer according to an embodiment of the present disclosure, wherein growth of lithium dendrite is inhibited by inorganic particles or a volume-swelling layer including the same.
Figure 8:
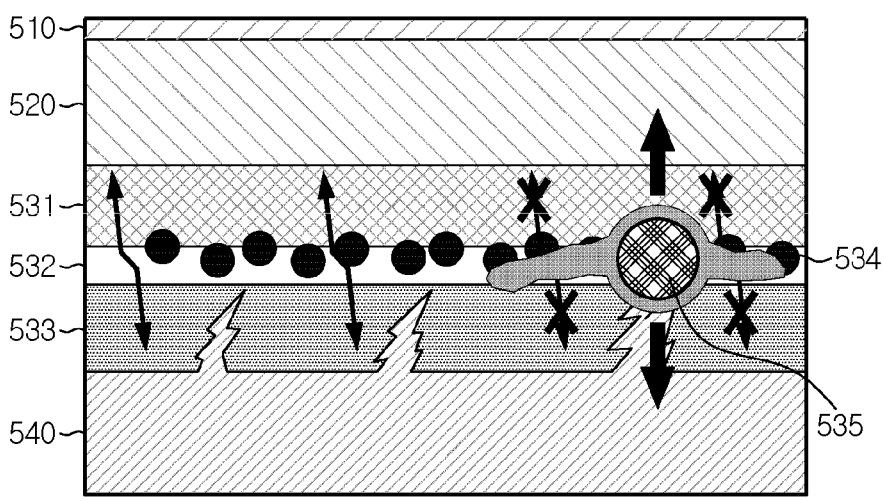

As shown in FIG. 7 and FIG. 8, the lithiated inorganic particles undergo volumetric swelling to form a dead space or voids in the solid electrolyte membrane. It is not possible to transport ions to the formed dead space or voids. Therefore, resistance in the electrode assembly is increased rapidly and lithium dendrite growth can be stopped. As a result, it is possible to inhibit a short-circuit between the positive electrode and the negative electrode fundamentally.

In the solid electrolyte membrane according to an embodiment of the present disclosure, the solid electrolyte membrane includes: (a) an ion conductive solid electrolyte material; and (b) inorganic particles capable of lithium ion or lithium intercalation. In other words, the inorganic particles (b) can receive lithium ions or lithium therein. Herein, lithium ions or lithium reacts physically, chemically or electrochemically with the inorganic particles to form a composite with the inorganic particles. Therefore, after the inorganic particles (b) are lithiated with lithium ions or lithium, the lithium ions or lithium cannot be deintercalated, and thus the lithiated inorganic particles cannot be returned to those before the lithiation. In other words, lithium cannot be deintercalated from the lithiated inorganic particles, since ion transport cannot be performed due to the formation of a dead space or voids, or an electrically insulated state is made away from lithium dendrite due to discharge. Thus, the lithiated inorganic particles cannot be returned to those before the lithiation.

The inorganic particles (b) physically, chemically or electrochemically react with lithium ions or lithium so that they may be lithiated, and include a metal, metal oxide, or both.

Particularly, when the inorganic particles are metal particles, the lithiation may be formation of an alloy of the metal inorganic particles with lithium ions or lithium.

Particularly, when the inorganic particles are metal oxide particles, the lithiation may be formation of a composite of the metal oxide particles with lithium ions or lithium through chemical binding.

More particularly, the lithiation may be reaction of the inorganic particles as shown in the following Formula 1:

$$X(Li)+Y(M)\rightarrow Li_xM_y \qquad \text{[Formula 1]}$$

wherein M includes Si, Sn, SiO, SnO, $MnO_2$, or two or more of them, each of x and y is determined depending on the oxidation number of M, and each of X and Y is an integer of 1 or more.

When the inorganic particles include both metal and metal oxide particles, the reaction scheme may also be applied.

According to the present disclosure, the inorganic particles (b) are lithiated with lithium ions or lithium and undergo volumetric swelling.

In other words, according to the present disclosure, it is possible to form voids in the solid electrolyte membrane during the operation of a battery by using inorganic particles capable of volumetric swelling. It is possible to fundamentally limit transport of lithium ions or lithium through the formation of voids. It is also possible to degenerate the battery with no micro-short circuit, as the resistance of the battery is increased. In other words, it is possible to fundamentally prevent a safety problem caused by a short-circuit, according to an embodiment of the present disclosure.

To accomplish this, the inorganic particles (b) according to the present disclosure are disposed in such a manner that they may not be in direct contact with an electrode. In other words, the inorganic particles are disposed inside the solid electrolyte membrane and can fundamentally inhibit growth of lithium dendrite formed during the operation of the battery.

Meanwhile, according to an embodiment of the present disclosure, it is preferred that the inorganic particles are packed closely in order to generate voids through the volumetric swelling of the inorganic particles in the solid electrolyte membrane.

According to an embodiment of the present disclosure, the inorganic particles (b) may have a volumetric swelling ratio of 10-1000%, 20-500%, or 50-300% after the lithiation, as compared to the volume before the lithiation. In other words, when the inorganic particles (b) are lithiated with lithium ions or lithium, lithiated inorganic particles (c) are produced, and the lithiated inorganic particles (c) have a significantly larger volume as compared to the inorganic particles (b).

Herein, the lithiated inorganic particles (c) may be represented by the following Formula 2:

$$Li_xM_y \qquad \text{[Formula 2]}$$

wherein M includes Si, Sn, SiO, SnO, $MnO_2$, or two or more of them, and each of x and y is determined depending on the oxidation number of M.

According to an embodiment of the present disclosure, the inorganic particles (b) include a metal or metal oxide. Particularly, the inorganic particles may include Si, Sn, SiO, SnO, $MnO_2$, $Fe_2O_3$, or two or more of them.

Particularly, Si is suitable for the solution of the problem according to an embodiment of the present disclosure, since Si has a volumetric swelling ratio up to about 300% after lithiation, as compared to the volume before lithiation.

According to an embodiment of the present disclosure, the inorganic particles (b) may be present in an amount of 1-30 wt %, 2-20 wt %, or 5-10 wt %, based on 100 wt % of the solid electrolyte membrane.

According to an embodiment of the present disclosure, the solid electrolyte membrane includes at least two solid electrolyte layers and at least one volume-swelling layer, the volume-swelling layer is disposed between the solid electrolyte layers, and the volume-swelling layer may include the ion conductive solid electrolyte material (a) and the inorganic particles (b).

In the volume-swelling layer, the inorganic particles may be dispersed with uniform distribution or non-uniform distribution throughout the volume-swelling layer. In this case, the volume-swelling layer may have a micropattern formed by self-assembly of a polymeric material, and thus it effectively inhibits growth of lithium dendrite, while not causing a decrease in ion conductivity.

According to an embodiment of the present disclosure, the volume-swelling layer may be patterned in such a manner that pattern units containing inorganic particles may be arranged regularly or randomly in the volume-swelling layer. The pattern unit may include inorganic particles alone, or may include a mixture of inorganic particles with a solid electrolyte material, if necessary. Meanwhile, a non-coated portion that may be present between the pattern units may be embedded in the solid electrolyte layers stacked on the upper part/lower part of the volume-swelling layer, or may be filled with a separate solid electrolyte material.

Figure 4:
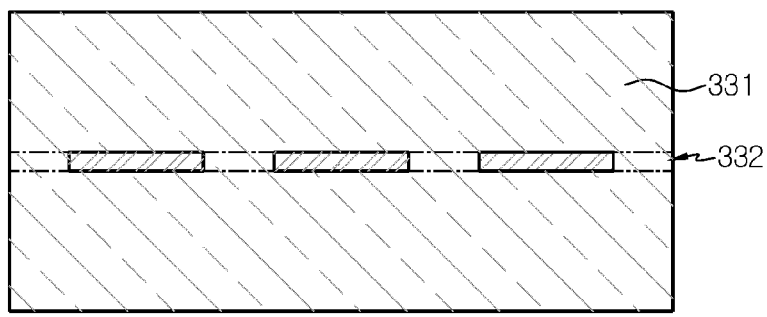
FIG. 4 is a schematic view illustrating a solid electrolyte membrane including a patterned volume-swelling layer.

For example, the pattern unit means a portion containing the inorganic particles at high concentration in the volume-swelling layer. For example, the pattern unit means a portion containing the inorganic particles at a concentration of 50 wt % or more, 60 wt % or more, or 70 wt % or more, based on 100 wt % of one pattern unit. The pattern unit may include the inorganic particles (b) alone, or a mixture of the inorganic particles (b) with the ion conductive solid electrolyte material (a). Meanwhile, the non-coated portion that may be present between the pattern units may be embedded in the solid electrolyte layers stacked on the upper part/lower part of the volume-swelling layer (see, FIG. 5), or may be filled with a separate solid electrolyte material (see, FIG. 4). According to an embodiment of the present disclosure, the pattern units are not limited to a particular shape. The planar shape of the pattern units may be a circular or quadrangular closed curve shape. In the case of a linear pattern, the pattern units may be formed in such a manner that they may be in parallel with each other or may cross each other. For example, the pattern units may have a stripe- or dot-like planar shape. FIG. 4 is a schematic sectional view illustrating the solid electrolyte membrane 330 according to an embodiment of the present disclosure, wherein a plurality of pattern elements 332a (not shown) are present in the volume-swelling layer 332. According to an embodiment of the present disclosure, it is preferred that the area of the solid electrolyte layer covered with the volume-swelling layer is less than 80%, less than 70%, less than 60%, or less than 50%, based on 100 area % of the surface of the solid electrolyte layer. When the surface of the solid electrolyte layer is covered excessively with the volume-swelling layer, the volume-swelling layer interrupts the ion channel to cause degradation of ion conductivity characteristics of the solid electrolyte membrane. When the area covered with the volume-swelling layer satisfies the above-defined range, it is possible to provide a high effect of inhibiting lithium dendrite growth and to prevent degradation of lithium ion conductivity, caused by the formation of the volume-swelling layer. However, the above-mentioned shapes of the volume-swelling layer and the solid electrolyte membrane are merely illustrative, and there is no particular limitation in the shape, as long as it can realize the structural characteristics according to the present disclosure.

According to the present disclosure, the thickness of the volume-swelling layer may vary with methods for forming the volume-swelling layer. For example, the volume-swelling layer may have a thickness larger than 0 and equal to or less than 100 μm. When the volume-swelling layer is patterned by a mixture with a solid electrolyte material, the thickness may be 10 nm to 100 μm. Within the above-defined range, the thickness may be 70 m or less, 50 μm or less, or 30 μm or less.

Figure 5:
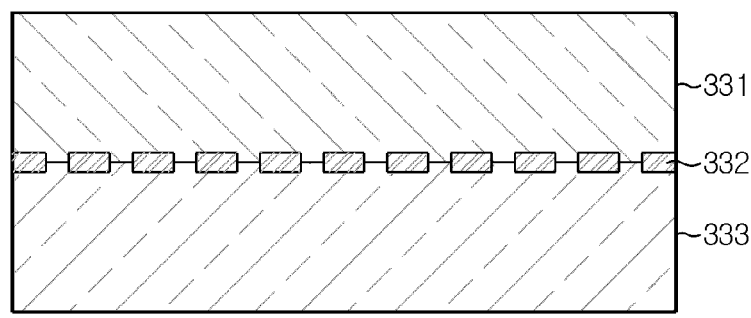
FIG. 5 and FIG. 6 are schematic sectional views illustrating the solid electrolyte membrane according to an embodiment of the present disclosure.

According to an embodiment of the present disclosure, the volume-swelling layer may be formed by introducing an inhibiting material to a suitable solvent to prepare an inhibiting material solution and coating the inhibiting material solution on the surface of the solid electrolyte layer. When the volume-swelling layer is introduced in the above-mentioned manner, it is possible to form a volume-swelling layer with a significantly small thickness, such as a nanometer-scaled thickness. In addition, according to an embodiment of the present disclosure, the solution may be coated in such a manner that the volume-swelling layer may have a stripe- or dot-like pattern. In this case, the non-coated portion having no pattern unit has a significantly small thickness so that it may be embedded in the solid electrolyte layers stacked on the upper side/lower side thereof. Thus, it is possible to minimize generation of a space between the upper and lower solid electrolyte layers and an increase in interfacial resistance caused thereby. FIG. 5 is a schematic view illustrating the non-coated portion of the volume-swelling layer 332 embedded in the first solid electrolyte layer 333 and the second solid electrolyte layer 331. When forming the volume-swelling layer by applying the inorganic particle composition, the volume-swelling layer may be formed to have a thickness of 700 nm or less, 500 nm or less, 300 nm or less, 100 nm or less, or 50 nm or less.

According to an embodiment of the present disclosure, besides the method for forming a volume-swelling layer by applying the inorganic particle composition directly onto the surface of a solid electrolyte layer, a method including forming a patterned volume-swelling layer on a separate release sheet and transferring the patterned volume-swelling layer to a solid electrolyte layer, or a method of patterning a volume-swelling layer on a solid electrolyte layer through lithography may be applied. Meanwhile, when the volume-swelling layer is patterned, the inorganic particles may be further exposed through $O_2$ plasma, UV-ozone, etching, or the like, after carrying out a patterning process.

Meanwhile, according to an embodiment of the present disclosure, self-assembly of a copolymer may be applied to the volume-swelling layer. It is possible to align micropattern units (e.g. micelles) with a nanometer scale on the volume-swelling layer with uniform distribution. The volume-swelling layer formed by self-assembly of a copolymer includes inorganic particles and a copolymer, wherein the inorganic particles are chemically bound to the copolymer. As used herein, 'chemically bound' means that the inorganic particles are bound to the copolymer in a chemical mode, such as ionic bonding, covalent bonding, coordinate bonding, or the like. When the volume-swelling layer is formed by self-assembly of a copolymer as mentioned above, the volume-swelling layer may have a thickness of 1 µm or less, 700 nm or less, 500 nm or less, 300 nm or less, 100 nm or less, or 50 nm or less.

Meanwhile, in the case of patterning of an inhibiting material through self-assembly of a copolymer according to an embodiment of the present disclosure, the copolymer includes a functional group capable of forming chemical binding with the inhibiting material. In other words, the inhibiting material is bound with the copolymer by means of the functional group. According to an embodiment of the present disclosure, the functional group contains oxygen or nitrogen. For example, the functional group may include at least one of the functional groups capable of being bound with a metal salt, such as ether and amine groups. Herein, attraction force works between the negative (−) charges in such functional groups and the positive (+) charges of metal ion in the metal salt to accomplish such binding.

Particular examples of the copolymer include polystyrene-block-poly(2-vinylpyridine) copolymer, polystyrene-block-poly(4-vinylpyridine) copolymer, poly(1,4-isoprene)-block-polystyrene-block-poly(2-vinylpyridine) copolymer, polystyrene-block-poly(ethylene oxide) copolymer, or the like. However, the copolymer is not particularly limited, as long as it includes the above-mentioned functional group and can form a nano-scaled micropattern through self-assembly.

According to an embodiment of the present disclosure, the volume-swelling layer may have a pattern in which micelles formed by the self-assembled block copolymer are aligned in a hexagonal closed packed structure. For example, when using polystyrene-block-poly(4-vinyl pyridine) as a block copolymer, micelles essentially including polyvinyl pyridine blocks (PVP) are aligned regularly in a matrix essentially including polystyrene blocks (PS), and the inorganic particles bound to the PVP blocks can ensure a high-level of homogeneously dispersed state throughout the whole surface of the volume-swelling layer according to such alignment of micelles. The micelles may include core portions and shell portions surrounding the core surfaces, and the inorganic particles are bound to the core portions and/or shell portions.

Figure 6:
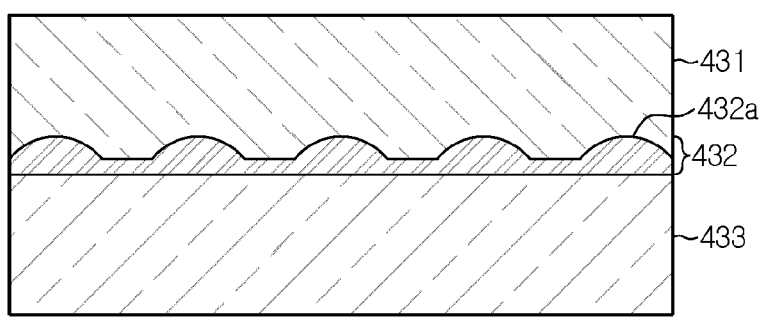

FIG. 6 is a sectional schematic view illustrating a volume-swelling layer formed by a self-assembled block copolymer and a solid electrolyte membrane including the same. Referring to FIG. 6, the solid electrolyte membrane 430 includes a volume-swelling layer 432 interposed between the first solid electrolyte layer 433 and the second solid electrolyte layer 431. The micelles 432a, particularly the core portions of the micelles have a relatively larger thickness, while the gap between one micelle and another micelle has a relatively smaller thickness. In a variant, the gap between one micelle and another micelle may have no matrix depending on processing conditions, such as spin coating speed, micelle solution concentration, or the like. Therefore, even when the volume-swelling layer is disposed so that it may cover most part of the surface of the solid electrolyte layer, lithium ions can be transmitted through the matrix so that the solid electrolyte layer can retain ion conductivity suitably. Even when the solid electrolyte layer shows slightly reduced ion conductivity, it can be used as a solid electrolyte membrane with no problem. According to an embodiment of the present disclosure, the thickness of the volume-swelling layer may be controlled through $O_2$ plasma or UV-ozone treatment. In this manner, it is possible to transport ions, while inhibiting lithium dendrite growth by virtue of the inorganic particles bound to the cores of the micelles.

According to an embodiment of the present disclosure, the micelles may have a size of 20-300 nm, and the gap between micelles may be 10-500 nm.

As mentioned above, since the electrolyte membrane according to the present disclosure includes inorganic particles, it is possible to effectively inhibit a short-circuit caused by lithium dendrite growth, when the electrolyte membrane is applied to a solid-state battery including lithium metal as a negative electrode active material.

The volume-swelling layer includes the inorganic particles at a higher concentration as compared to the other layers (e.g. solid electrolyte layer). For example, the volume-swelling layer may include the inorganic particles in an amount of 30-100 wt % based on 100 wt % of the volume-swelling layer. Within the above-defined range, the content of the inorganic particles may be 50 wt % or more, 80 wt % or more, or 90 wt % or more. Since the content of the inorganic particles is high, a decrease in ion conductivity is low, and thus it is possible to minimize a portion undesired in the solid electrolyte membrane. Meanwhile, the solid electrolyte membrane according to an embodiment of the present disclosure can fundamentally inhibit lithium dendrite growth within the above-defined range.

According to an embodiment of the present disclosure, the volume-swelling layer may be coated on the solid electrolyte layer in an amount less than 90%, less than 50%, or less than 30%, based on 100 area % of the surface of the solid electrolyte layer. When the volume-swelling layer is coated on the solid electrolyte layer within the above-defined range, it is possible to maximize an effect of improving safety, while minimizing a decrease in ion conductivity according to an embodiment of the present disclosure.

According to an embodiment of the present disclosure, thickness of the volume-swelling layer, concentration of the inorganic particles, area of the volume-swelling layer covering the solid electrolyte layer, or the like, may be controlled suitably considering ion conductivity of the solid electrolyte membrane. In other words, the volume-swelling layer included in the solid electrolyte membrane may be controlled to a suitable range of thickness of the volume-swelling layer, concentration of the inorganic particles, area of the volume-swelling layer covering the solid electrolyte layer, or the like, in such a manner that the solid electrolyte membrane may show an ion conductivity of $1 \times 10^{-5}$ S/cm or more.

(3) Structure of Solid Electrolyte Membrane

According to an embodiment of the present disclosure, the solid electrolyte membrane includes inorganic particles, and the inorganic particles are disposed in such a manner that they may not be in direct contact with an electrode.

The solid electrolyte membrane according to an embodiment of the present disclosure includes at least two solid electrolyte layers and at least one volume-swelling layer, wherein the volume-swelling layer is disposed between the solid electrolyte layers.

For example, the solid electrolyte membrane may have a layered structure in which a first solid electrolyte layer, a volume-swelling layer and a second solid electrolyte layer are stacked successively. In a variant, the solid electrolyte membrane may be provided with a first, second and a third solid electrolyte layers, and a first volume-swelling layer may be disposed between the first and the second solid electrolyte layers, and a second volume-swelling layer may be disposed between the second and the third electrolyte layers. In other words, the volume-swelling layer has such a structure that the inorganic particles contained in the volume-swelling layer may not be in direct contact with a positive electrode and/or negative electrode. Each of the volume-swelling layers is independent in terms of shape and materials, and one volume-swelling layer may be the same as or different from another volume-swelling layer. Each of the solid electrolyte layers is independent in terms of shape and materials, and one solid electrolyte layer may be the same as or different from another solid electrolyte layer.

According to an embodiment of the present disclosure, the solid electrolyte membrane may be obtained as follows, but is not limited thereto.

First, a first solid electrolyte layer is prepared.

Next, an ion conductive solid electrolyte material is introduced to a solvent to prepare a polymer solution, and inorganic particles are introduced to the polymer solution to prepare a composition for forming a volume-swelling layer. The polymer solution and composition may be subjected to agitation in order to disperse the ingredients introduced to the solvent homogeneously.

Meanwhile, according to the present disclosure, the solvent may include at least one selected from toluene, tetrahydrofuran, ethylene, acetone, chloroform and dimethylformamide (DMF).

Then, the composition for forming a volume-swelling layer is coated on the first solid electrolyte layer prepared as mentioned above, and then a second solid electrolyte layer may be stacked thereon. Herein, the first solid electrolyte layer may face a negative electrode.

According to the present disclosure, the solid electrolyte membrane having the volume-swelling layer shows an ion conductivity of $1 \times 10^{-7}$ S/cm or more, or $1 \times 10^{-6}$ S/cm or more. Herein, the ion conductivity is a value determined at the general operation temperature of a solid-state battery including the solid electrolyte membrane.

According to an embodiment of the present disclosure, the volume-swelling layer may further include at least one of a binder resin and an ion conductive solid electrolyte material, besides the inorganic particles. The binder resin is not particularly limited, as long as it is an ingredient which assists binding between the inorganic particles and binding between the volume-swelling layer and the other solid electrolyte layer, and is electrochemically stable. Non-limiting examples of the binder resin include acrylic polymer, polyvinylidene fluoride, polyvinyl alcohol, carboxymethyl cellulose (CMC), starch, hydroxypropyl cellulose, regenerated cellulose, polyvinyl pyrrolidone, tetrafluoroethylene, ethylene-propylene-diene terpolymer (EPDM), sulfonated EPDM, styrene butadiene rubber, fluororubber, various copolymers, or the like.

According to an embodiment of the present disclosure, thickness of the volume-swelling layer, concentration of the inorganic particles, area of the volume-swelling layer covering the solid electrolyte layer, or the like, may be controlled suitably, considering ion conductivity of the solid electrolyte membrane. In other words, the volume-swelling layer included in the solid electrolyte membrane may be controlled to a suitable range of thickness of the volume-swelling layer, concentration of the inorganic particles, area of the volume-swelling layer covering the solid electrolyte layer, or the like, in such a manner that the solid electrolyte membrane may show an ion conductivity of $1 \times 10^{-5}$ S/cm or more.

Meanwhile, according to an embodiment of the present disclosure, the composition of the ion conductive solid electrolyte contained in the first solid electrolyte layer may be the same as or different from the composition of the ion conductive solid electrolyte contained in the second solid electrolyte layer. For example, the first layer may include an oxide-based solid electrolyte material and the second layer may include a sulfide-based solid electrolyte material.

According to an embodiment, the solid electrolyte membrane may be obtained by forming a first solid electrolyte layer, forming a volume-swelling layer on the surface of the first solid electrolyte layer, and forming a second solid electrolyte layer on the surface of the volume-swelling layer. When two or more volume-swelling layers are used, a volume-swelling layer may be formed on the second solid electrolyte layer, and then a third solid electrolyte layer may be formed thereon. According to an embodiment of the present disclosure, when manufacturing a solid electrolyte membrane including a larger number of volume-swelling layers or solid electrolyte layers, formation of a volume-swelling layer and formation of a solid electrolyte layer may be carried out repeatedly.

Reference will be made to the above description about the inorganic particles and ion conductive solid electrolyte materials contained in the volume-swelling layer and the first and the second solid electrolyte layers.

Herein, the volume-swelling layer may be patterned by the following method. For example, the volume-swelling layer may be formed as a patterned layer with a convex pattern on the surface of the first solid electrolyte layer. Then, slurry for the second solid electrolyte layer is applied to the surface of the volume-swelling layer so that the non-coated portion (portion having no volume-swelling layer) between patterns may be embedded in the second solid electrolyte. For example, volume-swelling layer pattern units including inorganic particles are formed on the surface of the first solid electrolyte layer. Then, the surface is covered with the second solid electrolyte layer to form a solid electrolyte membrane. According to an embodiment of the present disclosure, the second solid electrolyte layer may be formed from flowable slurry. The slurry is applied to the surface of the first solid electrolyte layer having the volume-swelling layer pattern units so that the non-coated portions between the pattern units may be embedded. In this manner, it is possible to prevent generation of vacant spaces at the interfaces of the first solid electrolyte layer/volume-swelling layer/second electrolyte layer.

In a variant, the volume-swelling layer may be formed by forming a concave pattern having a predetermined thickness from the surface of the first solid electrolyte layer, and inlaying an inhibiting material to the concave pattern. Then, the surface of the volume-swelling layer may be covered with the second solid electrolyte layer to obtain a solid electrolyte membrane.

In addition, according to an embodiment of the present disclosure, the volume-swelling layer may be patterned through self-assembly of a copolymer. The method for forming a volume-swelling layer through self-assembly is not particularly limited, as long as it includes forming micelles with a structure in which they are aligned regularly or randomly in a volume-swelling layer. For example, a suitable copolymer capable of self-assembly is introduced to a solvent to prepare a polymer solution, and inorganic particles are introduced to the polymer solution to prepare a mixture for forming inorganic particles. The polymer solution and mixture may be subjected to agitation in order to disperse the ingredients introduced to the solvent homogeneously. Particularly, it is possible to accelerate the chemical binding of the inorganic particles with the copolymer by agitating the mixture. Then, the prepared mixture is applied to the surface of the solid electrolyte layer and then dried to induce self-assembly. The mixture may be applied by using a spin coating process. Herein, the coating speed may be controlled to a range of about 1,000-5,000 rpm. Meanwhile, according to the present disclosure, the solvent may include at least one selected from toluene, tetrahydrofuran, ethylene, acetone, chloroform and dimethylformamide. For example, the solvent may include toluene in terms of alignment of micelles with a hexagonal closed packed structure.

(4) Solid-State Battery

In another aspect of the present disclosure, there is provided a solid-state battery including the above-described solid electrolyte membrane. The solid-state battery includes a positive electrode, a negative electrode and a solid electrolyte membrane, wherein the solid electrolyte membrane includes the above-described solid electrolyte membrane.

Figure 3:
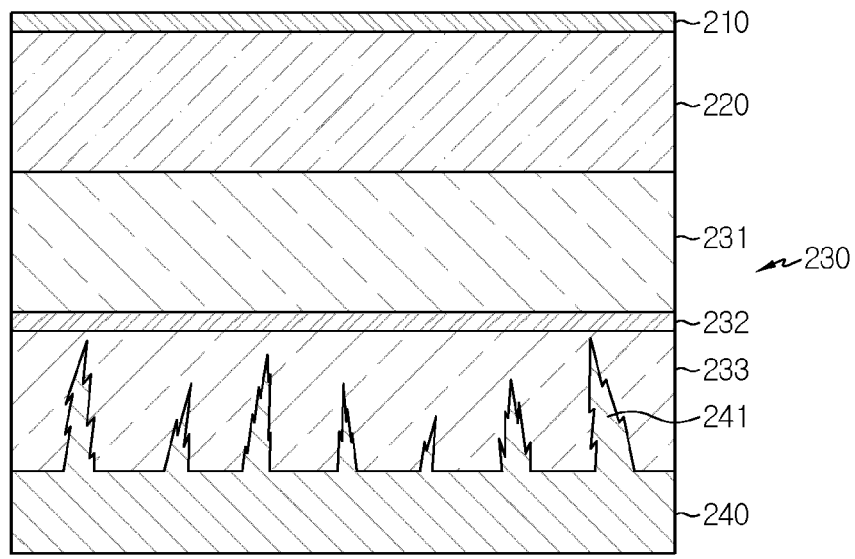
FIG. 3 is a schematic view illustrating the solid-state battery including the solid electrolyte membrane according to an embodiment of the present disclosure, wherein growth of lithium dendrite is inhibited by inorganic particles or a volume-swelling layer including the same.

FIG. 3 is a schematic view illustrating the solid-state battery 200 according to an embodiment of the present disclosure. In the solid-state battery, a positive electrode active material layer 220 is formed on the surface of a positive electrode current collector 210, and a negative electrode 240 is stacked on the positive electrode by means of a solid electrolyte membrane 230. The solid electrolyte membrane 230 includes a first solid electrolyte layer 233, a volume-swelling layer 232 and a second solid electrolyte layer 231, stacked successively. In the negative electrode, lithium dendrite 241 may be grown in the vertical direction and lithium dendrite growth may be inhibited by the volume-swelling layer 232.

In the solid-state battery having the above-mentioned structure, the first solid electrolyte layer faces the negative electrode, and the first solid electrolyte layer may have a larger thickness as compared to the second solid electrolyte layer.

In addition, according to an embodiment of the present disclosure, an additional element, such as a separate protective layer, may be provided on the surface of the solid electrolyte membrane facing the negative electrode. Particularly, a passive film using an inorganic solid electrolyte, inorganic material, such as LiF or $Li_2O$, or an organic material, such as PEO-based material, may be provided in order to inhibit reaction caused by direct contact with Li metal.

According to an embodiment of the present disclosure, the solid electrolyte membrane includes a first solid electrolyte layer, a second solid electrolyte layer and a volume-swelling layer, wherein the volume-swelling layer is disposed between the solid electrolyte layers,
  the volume-swelling layer includes inorganic particles (b) capable of lithium intercalation,
  the first solid electrolyte layer faces the negative electrode, and
  the first solid electrolyte layer has a thickness larger than the thickness of the second solid electrolyte layer.

Since the first solid electrolyte layer close to the negative electrode has a larger thickness as compared to the thickness of the second solid electrolyte layer away from the negative electrode, lithium dendrite growth may be inhibited more effectively, thereby providing improved safety.

According to the present disclosure, each of the positive electrode and the negative electrode includes a current collector and an electrode active material layer formed on at least one surface of the current collector, and the active material layer includes a plurality of electrode active material particles and a solid electrolyte. In addition, the electrode may further include at least one of a conductive material and a binder resin, if necessary. Each electrode may further include various additives in order to supplement or improve the physicochemical properties thereof.

According to the present disclosure, the negative electrode may include a current collector and a negative electrode active material layer formed on the surface of the current collector, wherein the negative electrode active material layer may include at least one element that belongs to alkali metals, alkaline earth metals, Group 3B metals and transition metals. According to an embodiment of the present disclosure, non-limiting examples of alkali metals include at least one metal selected from the group consisting of lithium (Li), sodium (Na), potassium (K), rubidium (Rb), cesium (Cs) and francium (Fr), preferably lithium. According to an embodiment of the present disclosure, the negative electrode may be formed by binding and stacking the negative electrode current collector with lithium metal foil having a predetermined thickness through compression.

According to the present disclosure, the positive electrode includes a current collector and a positive electrode active material layer formed on at least one surface of the current collector, wherein the positive electrode active material layer includes a positive electrode active material, a solid electrolyte and a conductive material. According to an embodiment of the present disclosure, the positive electrode active material layer may further include a binder material. It is possible to increase the binding force of the positive electrode active material layer with the current collector and/or the solid electrolyte membrane by introducing the binder material. Independently from this or in addition to this, introduction of the binder material assists improvement of the binding force of the ingredients contained in the positive electrode active material layer.

In the case of the positive electrode, the electrode active material may be any material used conventionally as a positive electrode active material for a lithium ion secondary battery. Non-limiting examples of the positive electrode active material may include, but are not limited to: layered compounds such as lithium cobalt oxide ($LiCoO_2$) and lithium nickel oxide ($LiNiO_2$), or those compounds substituted with one or more transition metals; lithium manganese oxides such as those represented by the chemical formula of $Li_{1+x}Mn_{2-x}O_4$ (wherein x is 0-0.33), $LiMnO_3$, $LiMn_2O_3$ and $LiMnO_2$; lithium copper oxide ($Li_2CuO_2$); vanadium oxides such as $LiV_3O_8$, $LiV_3O_4$, $V_2O_5$ or $Cu_2V_2O_7$; lithium nickel oxides represented by the chemical formula of $LiNi_{1-x}M_xO_2$ (wherein M is Co, Mn, Al, Cu, Fe, Mg, B or Ga, and x is 0.01-0.3), such as $LiNi_{0.8}Co_{0.1}M_{0.1}O_2$; lithium manganese composite oxides represented by the chemical formula of $LiMn_{1-x}M_xO_2$ (wherein M=Co, Ni, Fe, Cr, Zn or Ta, and x=0.01-0.1) or $Li_2Mn_3MO_8$ (wherein M=Fe, Co, Ni, Cu or Zn); lithium manganese composite oxides having a spinel structure and represented by the formula of $LiNi_xMn_{2-x}O_4$; $LiMn_2O_4$ in which Li is partially substituted with an alkaline earth metal ion; disulfide compounds; $Fe_2(MoO_4)_3$; or the like.

According to the present disclosure, the current collector includes a metal plate and shows electrical conductivity, and any suitable current collector may be used depending on polarity of electrode known in the field of secondary batteries. In addition, the current collector is generally formed to have a thickness of 3-500 μm. The current collector is not particularly limited, as long as it causes no chemical change in the corresponding battery and has high conductivity. For example, the current collector may include copper, stainless steel, aluminum, nickel, titanium, baked carbon, or aluminum or stainless steel surface-treated with carbon, nickel, titanium, silver, or the like. Any suitable current collector may be used depending on polarity of the electrode (positive or negative electrode).

According to the present disclosure, the conductive material is generally added in an amount of 1-30 wt % based on the total weight of the mixture including the electrode active material. Such a conductive material is not particularly limited, as long as it causes no chemical change in the corresponding battery and has conductivity. For example, the conductive material include any one selected from: graphite, such as natural graphite or artificial graphite; carbon black, such as carbon black, acetylene black, Ketjen black, channel black, furnace black, lamp black or thermal black; conductive fibers, such as carbon fibers or metallic fibers; carbon fluoride; metal powder, such as aluminum powder or nickel powder; conductive whisker, such as zinc oxide or potassium titanate; conductive metal oxide, such as titanium oxide; and conductive materials, such as polyphenylene derivatives, or a mixture of two or more of them.

According to the present disclosure, the binder resin is not particularly limited, as long as it is an ingredient which assists binding between the active material and the conductive material and binding to the current collector. Particular examples of the binder resin include polyvinylidene fluoride, polyvinyl alcohol, carboxymethyl cellulose (CMC), starch, hydroxypropyl cellulose, regenerated cellulose, polyvinyl pyrrolidone, polytetrafluoroethylene, polyethylene, polypropylene, ethylene-propylene-diene terpolymer (EPDM), sulfonated EPDM, styrene butadiene rubber, fluororubber, various copolymers, or the like. In general, the binder resin is added in an amount of 1-30 wt %, or 1-10 wt %, based on 100 wt % of the electrode layer.

According to an embodiment of the present disclosure, the electrode active material layer may include at least one additive, such as an oxidation-stabilizing agent, reduction-stabilizing agent, flame retardant, heat stabilizer, anti-fogging agent, or the like, if necessary.

According to the present disclosure, the solid electrolyte may further include at least one of a polymeric solid electrolyte, oxide-based solid electrolyte and a sulfide-based solid electrolyte.

According to the present disclosure, different solid electrolytes may be used for the positive electrode, negative electrode and the solid electrolyte membrane, or the same solid electrolyte may be used for two or more battery elements. For example, in the case of a positive electrode, a polymeric electrolyte having excellent oxidation stability may be used as a solid electrolyte. In addition, in the case of a negative electrode, a polymeric electrolyte having excellent reduction stability is used preferably as a solid electrolyte. However, the scope of the present disclosure is not limited thereto. Since the solid electrolyte mainly functions to transport lithium ions in the electrode, any material having a high ion conductivity, such as $10^{-7}$ s/cm or more, or $10^{-5}$ s/cm or more, may be used with no particular limitation.

According to the present disclosure, the polymeric electrolyte may be a solid polymeric electrolyte formed by adding a polymer resin to a solvated lithium salt, or a polymeric gel electrolyte formed by impregnating a polymer resin with an organic electrolyte containing an organic solvent and a lithium salt.

Herein, reference will be made to the above description of the solid electrolyte membrane about the polymeric electrolyte.

In another aspect of the present disclosure, there is provided a secondary battery having the above-described structure. There are also provided a battery module including the secondary battery as a unit cell, a battery pack including the battery module, and a device including the battery pack as a power source. Herein, particular examples of the device may include, but are not limited to: power tools driven by an electric motor; electric cars, including electric vehicles (EV), hybrid electric vehicles (HEV), plug-in hybrid electric vehicles (PHEV), or the like; electric carts, including electric bikes (E-bikes) and electric scooters (E-scooters); electric golf carts; electric power storage systems; or the like.

Examples will be described more fully hereinafter so that the present disclosure can be understood with ease. However, the following examples are for illustrative purposes only and the scope of the present disclosure is not limited thereto.

Example 1

1. Manufacture of Solid Electrolyte Membrane
(1) Formation of First Solid Electrolyte Layer and Second Solid Electrolyte Layer First, polyethylene oxide (PEO, Mw=4,000,000 g/mol) was dissolved in acetonitrile (AN) as a solvent to prepare a polymer solution having a concentration of 4 wt %. Herein, LiTFSI as a lithium salt was further introduced so that the molar ratio of [EO]/[Li$^+$] might be 18/1. The polymer solution was agitated overnight at 70° C. so that PEO and lithium salt might be dissolved therein sufficiently. Next, an additive solution containing an initiator and a curing agent was prepared. The curing agent was PEGDA (Mw=575) and the initiator was benzoyl peroxide (BPO), wherein polyethylene diacrylate (PEGDA) was used at 20 wt % based on PEO, BPO was used at 1 wt % based on PEGDA, and acetonitrile was used as a solvent. The additive solution was agitated for about 1 hour so that the ingredients introduced thereto might be mixed thoroughly. Then, the mixed solution was applied to and coated on a release film by using a doctor blade. The coating gap was set to 800 μm and the coating speed was set to 20 mm/min. The release film coated with the solution was transferred to a glass plate, allowed to maintain level, dried overnight at room temperature, and vacuum dried at 100° C. for 12 hours. In this manner, a first solid electrolyte layer and a second solid electrolyte layer were formed. The obtained first and second solid electrolyte layers had a thickness of about 50 μm.

(2) Formation of Volume-Swelling Layer

Si particles (Sigma-Aldrich, <100 nm) as inorganic particles were dispersed in NMP as a solvent to a concentration of 1 wt % through ultrasonication to prepare a dispersion of inorganic particles. The prepared dispersion was spin-coated on the first solid electrolyte layer in an amount of 1 wt % based on the weight of the first solid electrolyte layer, thereby forming a volume-swelling layer on the first solid electrolyte layer.

(3) Structure of Multi-Layered Solid Electrolyte Membrane

The first solid electrolyte layer coated with the volume-swelling layer and the second solid electrolyte layer were stacked and the resultant structure was subjected to calendering with a gap between rolls controlled to 100 μm at 60° C. Herein, the volume-swelling layer was disposed between the first solid electrolyte layer and the second solid electrolyte layer. In this manner, a solid electrolyte membrane including the first solid electrolyte layer, volume-swelling layer and the second solid electrolyte layer, stacked successively, was obtained. The obtained solid electrolyte membrane had a thickness of about 100 μm.

2. Manufacture of Positive Electrode

To obtain slurry, NCM811 ($LiNi_{0.8}Co_{0.1}Mn_{0.1}O_2$) as an electrode active material, VGCF (vapor grown carbon fiber) as a conductive material and a polymeric solid electrolyte (PEO+LiTFSI, molar ratio 18:1) were mixed at a weight ratio of 80:3:17 and introduced to acetonitrile, followed by agitation, to obtain electrode slurry. The slurry was applied to an aluminum current collector having a thickness of 20 μm by using a doctor blade and the resultant structure was vacuum dried at 120° C. for 4 hours. Next, pressing was carried out by using a roll press to obtain an electrode having an electrode loading of 2 mAh/cm$^2$, an electrode layer thickness of 48 μm and a porosity of 22%.

3. Manufacture of Battery

The positive electrode obtained as described above was cut into a circular shape having an area of 1.4875 cm$^2$. Lithium metal foil cut into a circular shape having an area of 1.7671 cm$^2$ was prepared as a negative electrode. The solid electrolyte membrane obtained as described above was interposed between the two electrodes to obtain a coin type half-cell. Herein, the battery was manufactured in such a manner that the surface of the first solid electrolyte layer not coated with the volume-swelling layer might face the negative electrode.

Example 2

A solid electrolyte membrane was obtained in the same manner as Example 1, except that the dispersion was spin-coated on the first solid electrolyte layer in an amount of 5 wt % based on the weight of the first solid electrolyte layer to form a volume-swelling layer on the first solid electrolyte layer.

Example 3

A solid electrolyte membrane was obtained in the same manner as Example 1, except that the volume-swelling layer was formed as follows. Particularly, Si particles (Sigma-Aldrich, <100 nm) as inorganic particles were dispersed in NMP solution containing 0.5 wt % of PEO+LiTFSi ([EO]/[Li$^+$]=18/1, molar ratio) added to NMP as a solvent to a concentration of 5 wt % through ultrasonication to prepare a dispersion of inorganic particles. The prepared dispersion was spin-coated on the first solid electrolyte layer in an amount of 1 wt % based on the weight of the first solid electrolyte layer, thereby forming a volume-swelling layer on the first solid electrolyte layer.

Example 4

A solid electrolyte membrane was obtained in the same manner as Example 1, except that the volume-swelling layer was formed as follows. Particularly, $SnO_2$ particles (Sigma-Aldrich, <100 nm) were used as inorganic particles instead of Si particles (Sigma-Aldrich, <100 nm), and a dispersion containing the inorganic particles was spin-coated on the first solid electrolyte layer in an amount of 5 wt % based on the weight of the first solid electrolyte layer, thereby forming a volume-swelling layer on the first solid electrolyte layer.

Example 5

A solid electrolyte membrane was obtained in the same manner as Example 1, except that the first solid electrolyte layer had a thickness of 30 μm and the second solid electrolyte layer had a thickness of 70 μm, and the dispersion containing the inorganic particles was spin-coated on the first solid electrolyte layer in an amount of 5 wt % based on the weight of the first solid electrolyte layer, thereby forming a volume-swelling layer on the first solid electrolyte layer. In other words, in the case of Example 5, the first solid electrolyte layer close to the negative electrode has a relatively smaller thickness as compared to the second solid electrolyte layer away from the negative electrode.

Example 6

A solid electrolyte membrane was obtained in the same manner as Example 1, except that the first solid electrolyte layer had a thickness of 70 μm and the second solid electrolyte layer had a thickness of 30 μm, and the dispersion containing the inorganic particles was spin-coated on the first solid electrolyte layer in an amount of 5 wt % based on the weight of the first solid electrolyte layer, thereby forming a volume-swelling layer on the first solid electrolyte layer. In other words, in the case of Example 6, the first solid electrolyte layer close to the negative electrode has a relatively larger thickness as compared to the second solid electrolyte layer away from the negative electrode.

Example 7

(1) Formation of First Solid Electrolyte Layer and Second Solid Electrolyte Layer First, polyethylene oxide (PEO, Mw=4,000,000 g/mol) was dissolved in acetonitrile (AN) as a solvent to prepare a polymer solution having a concentration of 4 wt %. Herein, LiTFSI as a lithium salt was further introduced so that the molar ratio of [EO]/[Li$^+$] might be 18/1. The polymer solution was agitated overnight at 70° C. so that PEO and lithium salt might be dissolved therein sufficiently. Next, an additive solution containing an initiator and a curing agent was prepared. The curing agent was PEGDA (Mw=575) and the initiator was benzoyl peroxide (BPO), wherein polyethylene diacrylate (PEGDA) was used at 20 wt % based on PEO, BPO was used at 1 wt % based on PEGDA, and acetonitrile was used as a solvent. The additive solution was agitated for about 1 hour so that the ingredients introduced thereto might be mixed thoroughly. Then, the mixed solution was applied to and coated on a release film by using a doctor blade. The coating gap was set to 800 μm and the coating speed was set to 20 mm/min. The release film coated with the solution was transferred to a glass plate, allowed to maintain level, dried overnight at room temperature, and vacuum dried at 100° C. for 12 hours. In this manner, a first solid electrolyte layer and a second solid electrolyte layer were formed. The obtained first and second solid electrolyte layers had a thickness of about 50 μm.

(2) Formation of Volume-Swelling Layer

Polystyrene-block-poly(4-vinyl pyridine) (S4VP, PS Mn 41.5 kg/mol, P4VP Mn 17.5 kg/mol) was agitated in toluene at a concentration of 0.5 wt % at room temperature for 1 day. Si particles (Sigma-Aldrich, <100 nm) as inorganic particles were added to the resultant solution and agitation was carried out for 6 hours so that Si Particles might be bound into S4VP micelles. The solution was spin-coated on the first solid electrolyte layer formed as described above at a speed of 3,000 rpm to carry out patterning of a single layer of S4VP micelles through self-assembly. Herein, the micelles had a size of 40 nm and a gap between micelles of about 70 nm.

(3) Structure of Multi-Layered Solid Electrolyte Membrane

The first solid electrolyte layer coated with the volume-swelling layer and the second solid electrolyte layer were stacked and the resultant structure was subjected to calendering with a gap between rolls controlled to 100 μm at 60° C. Herein, the volume-swelling layer was disposed between the first solid electrolyte layer and the second solid electrolyte layer. In this manner, a solid electrolyte membrane including the first solid electrolyte layer, volume-swelling layer and the second solid electrolyte layer, stacked successively, was obtained. The obtained solid electrolyte membrane had a thickness of about 100 m, wherein the volume-swelling layer had a thickness of 100 nm.

Example 8

A solid electrolyte membrane was obtained in the same manner as Example 7, except that the inorganic particles were added in an amount of 2 wt % based on 100 parts by weight of the total weight of the solid electrolyte layer when manufacturing the solid electrolyte membrane. Herein, the micelles had a size of 50 nm and a gap between micelles of about 70 nm.

Example 9

A solid electrolyte membrane was obtained in the same manner as Example 7, except that SnO$_2$ particles (Sigma-Aldrich, <100 nm) were used as inorganic particles instead of Si particles, when forming the volume-swelling layer. Herein, the micelles had a size of 40 nm and a gap between micelles of about 70 nm.

Comparative Example 1

A solid electrolyte membrane was obtained in the same manner as Example 1, except that the volume-swelling layer containing inorganic particles was not formed.

The test results of Examples 1-9 and Comparative Example 1 are shown in the following Table 1.

Test Examples

Determination of Ion Conductivity of Solid Electrolyte Membrane

Each of the solid electrolyte membranes according to Examples 1-9 and Comparative Example 1 was cut into a size of 1.7671 cm$^2$. The solid electrolyte membrane was interposed between two sheets of stainless steel (SUS) to obtain a coin cell. An analyzer (VMP3, Biologic science instrument) was used to measure electrochemical impedance at 60° C. under the conditions of an amplitude of 10 mV and a scan range of 500 kHz to 200 MHz. Based on this, ion conductivity was calculated.

Evaluation of Initial Discharge Capacity

Each of the batteries according to Examples 1-9 and Comparative Example 1 was charged/discharged at about 60° C. and the initial discharge capacity was evaluated.

Charge condition: constant current (CC)/constant voltage (CV) (4.0V, 0.05 C-rate, 0.005 C current cut-off)

Discharge condition: CC condition, 3V (0.05 C-rate)

After evaluating the initial discharge capacity, each battery was charged/discharged at 0.05 C-rate to determine the point where Li dendrite was formed during the evaluation of life characteristics.

TABLE 1

| | Ion conductivity (S/cm, 60° C.) | Initial discharge capacity (mAh/g, 4.15 V) | Short-circuit generation point (cycle) |
|---|---|---|---|
| Example 1 | 1 × 10$^{-4}$ | 119 | 9 |
| Example 2 | 9 × 10$^{-5}$ | 117 | 8 |
| Example 3 | 9 × 10$^{-5}$ | 118 | 8 |
| Example 4 | 9 × 10$^{-5}$ | 114 | 11 |
| Example 5 | 9 × 10$^{-5}$ | 116 | 5 |
| Example 6 | 9 × 10$^{-5}$ | 115 | 14 |
| Example 7 | 1 × 10$^{-4}$ | 121 | 8 |
| Example 8 | 9 × 10$^{-5}$ | 120 | 7 |
| Example 9 | 1 × 10$^{-4}$ | 119 | 10 |
| Comparative Example 1 | 1 × 10$^{-4}$ | 120 | 17 |

As can be seen from Table 1, even when using the same electrodes, different solid electrolyte membranes show different short-circuit generation points. The battery according to Comparative Example 1 causes a micro-short due to Li dendrite at the 17$^{th}$ cycle and thus has a risk of ignition or explosion in the following operation. On the contrary, in the case of Examples, Li dendrite is in contact with the volume-swelling material in the solid electrolyte, while not being in contact with the positive electrode and not causing a micro-short. Thus, each of the batteries according to Examples prevents the following event in advance through degeneration of quality. In addition, it is possible to control the operation time of a battery by adjusting the position of the volume-swelling material in terms of the interval in the direction of Li dendrite growth.

[Description of Drawing Numerals]

- 10: Solid-state battery
- 11: Current collector
- 12: Positive Electrode active material layer
- 13: Solid electrolyte layer
- 14: Negative electrode (lithium metal)
- 14a: Dendrite
- 130: Solid electrolyte membrane
- 131: Second solid electrolyte layer
- 132: Volume-swelling layer
- 133: First solid electrolyte layer
- 200: Solid-state battery
- 210: Current collector
- 220: Positive electrode active material layer
- 230: Solid electrolyte membrane
- 231: Second solid electrolyte layer
- 232: Volume-swelling layer
- 233: First solid electrolyte layer
- 240: Negative electrode (lithium metal)
- 241: Dendrite
- 330: Solid electrolyte membrane
- 331: Second solid electrolyte layer
- 332: Volume-swelling layer
- 333: First solid electrolyte layer
- 430: Solid electrolyte membrane
- 431: Second solid electrolyte layer
- 432: Volume-swelling layer
- 432a: Micelles
- 433: First solid electrolyte layer
- 500: Solid-state battery
- 510: Current collector
- 520: Positive electrode active material layer
- 531: Second solid electrolyte layer
- 532: First solid electrolyte layer
- 533: Volume-swelling layer
- 534: Inorganic particles (b)
- 535: Inorganic particles lithiated with lithium ions or lithium
- 540: Negative electrode (lithium metal)

What is claimed is:

1. A solid electrolyte membrane for a solid-state battery, comprising:
   (a) an ion conductive solid electrolyte material; and
   (b) inorganic particles capable of lithium ion or lithium intercalation,
   wherein the inorganic particles comprise a metal and/or metal oxide,
   wherein during operation of the solid-state battery, the inorganic particles react chemically or electrochemically with lithium ions or lithium so that they are lithiated, undergo volumetric swelling by the lithiation, and are disposed in such a manner that they are not in direct contact with an electrode, and
   wherein the inorganic particles (b) have a volumetric swelling ratio of 10-1000% after the lithiation as compared to a volume before the lithiation.

2. The solid electrolyte membrane according to claim 1, wherein the inorganic particles (b) have a volumetric swelling ratio of 20-500% after the lithiation as compared to a volume before the lithiation.

3. The solid electrolyte membrane according to claim 1, wherein the inorganic particles comprise Si, Sn, SiO, SnO, $MnO_2$, $Fe_2O_3$, or two or more of them.

4. The solid electrolyte membrane according to claim 1, wherein the inorganic particles (b) are present in an amount of 1-30 wt % based on 100 wt % of the solid electrolyte membrane.

5. The solid electrolyte membrane according to claim 1, wherein the ion conductive solid electrolyte material (a) has an ion conductivity of $10^{-5}$ S/cm or more, and comprises a polymeric solid electrolyte, oxide-based solid electrolyte, sulfide-based solid electrolyte, or two or more of them.

6. A solid-state battery comprising a positive electrode, a negative electrode and a solid electrolyte membrane interposed between the positive electrode and the negative electrode, wherein the solid electrolyte membrane is the same as defined in claim 1.

7. The solid-state battery according to claim 6, wherein the solid electrolyte membrane comprises a first solid electrolyte layer, a second solid electrolyte layer and a volume-swelling layer, wherein the volume-swelling layer is disposed between the first and second solid electrolyte layers, the volume-swelling layer includes the inorganic particles (b) capable of lithium ion or lithium intercalation, the first solid electrolyte layer faces the negative electrode, and the first solid electrolyte layer has a thickness larger than a thickness of the second solid electrolyte layer.

8. The solid electrolyte membrane according to claim 1, which further comprises:
   at least two solid electrolyte layers; and
   at least one volume-swelling layer,
   wherein the volume-swelling layer is disposed between the at least two solid electrolyte layers and includes the inorganic particles (b) capable of lithium ion or lithium intercalation.

9. The solid electrolyte membrane according to claim 8, wherein the volume-swelling layer has a thickness of 10 nm to 50 µm.

10. The solid electrolyte membrane according to claim 8, wherein the volume-swelling layer comprises the inorganic particles (b) in an amount of 30-100 wt % based on 100 wt % of the volume-swelling layer.

11. A solid electrolyte membrane for a solid-state battery, comprising:
    (a) an ion conductive solid electrolyte material; and
    (b) inorganic particles capable of lithium ion or lithium intercalation,
    wherein the inorganic particles are patterned with a plurality of pattern units, and the pattern units are distributed regularly or randomly,
    wherein the inorganic particles comprise a metal and/or metal oxide,
    (c) at least two solid electrolyte layers; and
    (d) at least one volume-swelling layer, wherein the volume-swelling layer is disposed between the at least two solid electrolyte layers,
    wherein during operation of the solid-state battery, the inorganic particles react physically, chemically or electrochemically with lithium ions or lithium so that they are lithiated, undergo volumetric swelling by the lithiation, and are disposed in such a manner that they are not in direct contact with an electrode;
    wherein the volume-swelling layer comprises the inorganic particles (b) and a copolymer to which the inorganic particles are chemically bound, and has a micropattern derived from self-assembly of the copolymer;
    wherein the copolymer comprises a functional group capable of forming chemical binding with the inorganic particles; and
    wherein the inorganic particles are bound to the copolymer by means of the functional group.

* * * * *